V. E. EDWARDS.
METAL CUTTING SHEARS.
APPLICATION FILED JULY 19, 1909.
1,031,056.
Patented July 2, 1912.
2 SHEETS—SHEET 1.
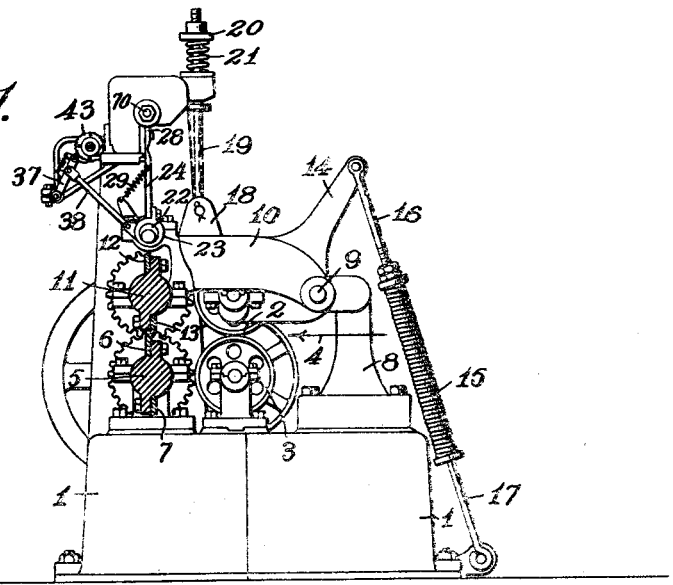
Witnesses
R. D. Tolman
Penelope Comberbach
Inventor
Victor E. Edwards,
By Rufus B. Fowler
Attorney V. E. EDWARDS.
METAL CUTTING SHEARS.
APPLICATION FILED JULY 19, 1909.
1,031,056.
Patented July 2, 1912.
2 SHEETS—SHEET 2.
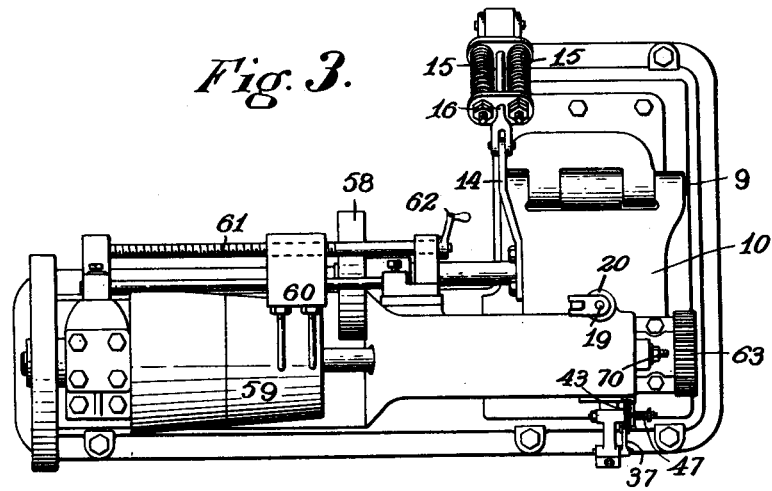
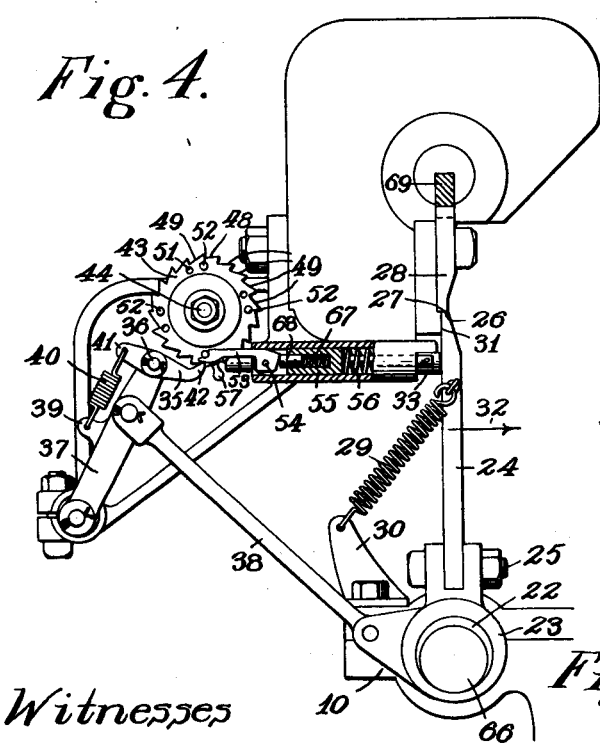
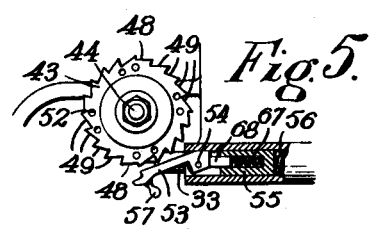
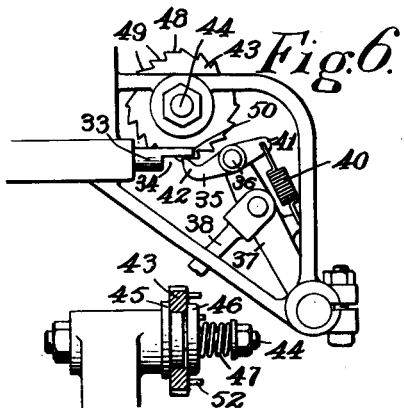
Witnesses
R. D. Tolman.
Penelope Cumberbach.
Inventor
Victor E. Edwards,
By Rufus B. Fowler
Attorney

UNITED STATES PATENT OFFICE.

VICTOR E. EDWARDS, OF WORCESTER, MASSACHUSETTS, ASSIGNOR TO MORGAN CONSTRUCTION COMPANY, OF WORCESTER, MASSACHUSETTS, A CORPORATION OF MASSACHUSETTS.

METAL-CUTTING SHEARS.

1,031,056.  Specification of Letters Patent.  Patented July 2, 1912.

Application filed July 19, 1909. Serial No. 508,345.

*To all whom it may concern:*

Be it known that I, VICTOR E. EDWARDS, a citizen of the United States, residing at Worcester, in the county of Worcester and Commonwealth of Massachusetts, have invented a new and useful Improvement in Metal-Cutting Shears, of which the following is a specification, accompanied by drawings forming a part of the same, in which—

Figure 1 is an end elevation of a metal cutting shear embodying my invention, partly shown in sectional view. Fig. 2 is a side elevation. Fig. 3 is a plan view. Figs. 4, 5, 6, 7 and 8 are detached views on a larger scale of the mechanism for bringing the cutting shear blades into operative relation with each other at predetermined periods in the operation of the shear.

Similar reference characters refer to similar parts in the different figures.

The metal cutting shear embodying my present invention belongs to the class known as rotary shears, in which a pair of shear blades rotating about parallel axes are brought into operative relation with each other during the rotative movement of the blades for the purpose of shearing a metal bar.

My invention has for its object to provide means whereby, during the continued rotation of the shear blades, they may be brought into operative relation with each other at predetermined intervals in order to determine the length of the severed pieces, and it consists in the construction and arrangement of parts as hereinafter described and pointed out in the annexed claims.

Referring to the accompanying drawings, 1 denotes the base of the framework upon which the operative portions of the shear are mounted.

2 and 3 denote feed rolls, suitably mounted in bearings in the framework of the machine, for feeding the metal to be cut between the shear blades in the direction of the arrow 4.

Mounted in the stationary bearing upon the base 1 is a shaft 5 carrying, attached to radial ribs, the shear blades 6 and 7. Mounted upon the base 1 is a stand 8 and pivoted to the stand 8 by a shaft 9 is a yoke 10, provided at its free end with bearings for a rotating shaft 11, which carries the shear blades 12 and 13 corresponding to and coöperating with the shear blades 6 and 7 carried upon the lower shaft 5.

The yoke 10 is provided with an arm 14, to the end of which the tension of the springs 15, 15, is applied through rods 16 and 17, pivoted to the arm 14 and to the base 1 respectively, to exert a pulling strain upon the arm 14 and act as a counter-balance to the weight of the yoke 10 and mechanism carried thereby. The yoke 10 is likewise provided with a lug 18 to which is pivoted a rod 19 carrying on its upper end a collar 20, between which and the framework of the shear is placed a spiral spring 21, with its tension exerted through the rod 19 to lift the free end of the yoke 10 upwardly on its pivotal shaft 9, in order to slightly separate the cutting edges of the shear blades carried by the lower and upper shafts 5 and 11, so that the metal fed forward by the feed rolls 2 and 3 may pass between the shear blades without being severed, except at such times as the free end of the yoke 10 may be depressed against the tension of the spring 21 by means of mechanism hereinafter described. The rotary shear blades carried by the shafts 5 and 11 are, therefore, operative in severing metal passing between them when the free end of the yoke 10 is depressed, but are otherwise inoperative, the upper blades 12 and 13 being raised out of contactual relation with the lower blades 6 and 7 by the tension of the spiral spring 21. The shear illustrated in the accompanying drawings is designed for cutting skelp or thin straps of metal, and a slight elevation of the yoke 10 is sufficient to bring the shear blades into inoperative relation to each other.

Means are provided for depressing the free end of the yoke 10 at stated intervals and also for varying the intervals, in order to sever the metal into pieces of predetermined lengths which are capable of being varied according to the will of the operator. The mechanism employed for this purpose is also designed to enable the operator to inaugurate a cutting action of the shear blades at any desired point as the metal is moved by the feed rolls 2 and 3 between the shear blades. The mechanism for bringing the shear blades into operative relation with each other comprises an eccentric 22 journaled in bearings in the free end of the yoke 10, and provided with an eccentric strap 23 to which a blade 24 is attached by bolts 25.

As the eccentric 22 is rotated, a vertically reciprocating motion is imparted to the blade 24 provided the blade is free to move in space. If, however, the upper end 26 of the blade 24 is made to contact during its upward movement with the lower end 27 of an adjustable fixed plate 28, then a downward movement will be imparted to the free end of the yoke 10 and the upper shear blades 12 and 13 will be brought into operative relation with the lower shear blades 6 and 7. A spiral spring 29 connects the blade 24 with a bracket 30 which is supported upon the yoke 10, in order to hold the upper end 26 of the blade 24 against the surface 31 of the fixed framework and in alinement with the end 27 of the adjustable plate 28, except when the plate is pushed forward in the direction of the arrow 32 by means of a sliding plunger 33, one end of which normally bears against the blade 24. The opposite end of the plunger 33 is cut away on its under side at 34 to provide space for the reciprocating movement of a pawl 35, which is pivotally held at 36 upon the free end of a swinging lever 37 connected by a link 38 with the eccentric strap 23, whereby a rocking motion is given to the lever 37. The lever 37 is provided with a lug 39, which is connected by a spiral spring 40 with the end 41 of the pawl 35. The opposite end 42 of the pawl engages the teeth of a ratchet wheel 43 which is held upon a fixed stud 44. The ratchet wheel 43 is frictionally held from rotating by being clamped between the washers 45 and 46 by the tension of a spring 47.

The ratchet wheel 43 is provided with teeth of varying depth, in the present instance each fifth tooth is more shallow than the remaining teeth, so that the periphery of the ratchet wheel is divided into sections, each section containing four deep teeth and one shallow tooth. Referring to Figs. 4 and 5, a shallow tooth is represented at 48 and the four deeper teeth at 49. As the ratchet wheel 43 is rotated by the engagement of the pawl 35 with the shallow tooth, such as that shown at 48, the advancing end of the pawl will move back and forth within the cut away space 34 of the plunger 33, but when the pawl engages one of the deeper teeth, such as at 49, the advancing end of the pawl will contact with the rear end 50 of the plunger 33, causing the plunger to be moved forward and the blade 24 to be pushed in the direction of the arrow 32 and carried out of alinement with the end 27 of the fixed plate 28, so that the blade 24 is free to move up and down in space by the rotation of the eccentric 22 without depressing the free end of the yoke 10. As the ratchet wheel 43 is intermittently rotated the distance of a single tooth at each swinging movement of the pawl 35, it is held from return movement by the clamping washers 45 and 46. The ratchet wheel 43 is provided with holes 51 arranged in pairs, one hole of each pair being placed opposite a shallow tooth 48 and the other hole opposite a deep tooth 49. The pins 52 are arranged to be engaged by the hooked end of a latch 53, pivoted at 54 to a bifurcated sliding bolt 55, capable of sliding within a chamber in the framework of the shear and having applied thereto the tension of a spiral spring 56. When the latch 53 engages one of the pins 52 of the ratchet wheel 43, the sliding bolt 55 is moved forward by the rotation of the ratchet wheel as the latter is actuated by the pawl 35. When the pawl 35 is reversed, the tension of the spring 56, acting through the sliding bolt 55 and latch 53, will reverse the movement of the ratchet wheel 43.

When the pins 52 are inserted in holes opposite the shallow teeth 48 of the ratchet wheel, the end 42 of the pawl will remain in one of the shallow teeth of the ratchet wheel and will be held out of contact with the rear end 50 of the sliding plunger 33, thereby allowing the blade 24 to contact during the rotary motion of the shear with the end 27 of the plate 28, causing the free end of the yoke 10 to be depressed and bring the blades of the shear into operative position. If the pins 52 are placed in the holes opposite the deep teeth, the pawl 35 will be maintained in engagement with one of the deep teeth and, at each swinging movement, it will engage the rear end 50 of the plunger 33, causing the blade 24 to be pushed forward in the direction of the arrow 32 so it will pass the fixed plate 28 and allowing the free end of the yoke 10 to remain in an elevated position, with the upper and lower blades of the shear separated sufficiently to allow the metal to pass between them without being severed.

The latch 53 is provided with a handle 57, by which the attendant may remove it from engagement with the pins 52 carried by the ratchet wheel into the position shown in Fig. 5. When the latch 53 is disengaged from the ratchet wheel, as shown in Fig. 5, an intermittent motion will be given to the ratchet wheel for the space of one tooth at each forward swinging movement of the pawl 35, and the severing of the metal passing between the upper and lower shear blades will then occur at each fifth tooth. The ratchet wheel 43 may be exchanged for other ratchet wheels having a different arrangement of deep and shallow teeth, by which the proportionate length of the severed pieces relatively to the rotative movement of the mechanism may be varied as desired.

Rotary motion is given to the feed rolls 2 and 3 through a belt pulley 58, having a belt connection with a suitable countershaft. Rotary motion is imparted to the lower shaft 5 by means of a cone pulley 59, having a belt connection with a corresponding cone pulley upon a suitable countershaft, the speed of the shaft 5 being varied by shifting the belt upon the cone pulley 59 by means of a shipper 60. The position of the shipper 60 is varied by means of an actuating screw 61, provided with a crank handle 62.

The lower and upper shafts 5 and 11 are connected by gears 63, having elongated teeth to permit the separation of the shafts 5 and 11 sufficiently to allow the metal to pass between the rotating shear blades. The upper shaft 11 is provided with a gear 64 which engages a gear 65 on the shaft 66 of the eccentric 22, the ratio of the gears 64 and 65 being two to one, causing the eccentric shaft to be driven twice as fast as the upper shaft 11 when two shear blades are carried by the latter. The operation of the shear blades and the shear controlling mechanism are, therefore, suitably timed to coöperate at the proper period during the passage of metal between the shear blades.

By the above described mechanism, the operator is able to hold the upper shear shaft in a permanently raised position, or cause it to be regularly depressed, by means of the arrangement of the pins 52 and by the operation of the latch 53 and spring 56. The attendant may also begin the operation of cutting at any period during the passage of the metal between the shear blades, or he may bring the shear controlling mechanism into continued operation, by which the length of the severed pieces will be varied as determined by the arrangement of shallow and deep teeth upon the ratchet wheel. The length of the metal passing between the shear blades between each cutting operation may also be varied, by varying the speed of the shafts 5 and 11 relatively to the speed of the feed rolls 2 and 3, causing a shorter or longer piece of metal to pass between the shear blades between each cutting operation.

By disconnecting the framework of the shear from the free end of the yoke 10, the latter may be swung upward on its pivotal shaft 9 to permit free access to the different parts of the machine, and especially to the shear blades carried by the shafts 5 and 11.

The bifurcated bolt 55 is recessed to receive a spiral spring 67, which acts against a plunger 68 to press the latter against the beveled end of the latch 53 and hold the latter in position, either in engagement with the pins 52, or disengaged therefrom, as shown in Fig. 5.

The plate 28 is vertically adjustable by means of a sliding wedge 69 which is drawn forward by a nut 70, in order to force the adjustable plate 28 downward at the proper vertical position to cause the blade 24, when contacting with the plate 28, to move the free end of the yoke downward far enough to cause the coöperating shear blades to completely sever the metal passing between them.

The eccentric 22 is in constant rotation owing to its geared connection with the rotating shear blade shafts; but it is inoperative to swing the yoke 10, except as determined by the position of the blade 24. At each revolution of the eccentric 22, a swinging movement is given to the pawl 35, but the pawl 35 is inoperative to control the position of the blade 24 except as its forward end 42 is raised to contact with the end 50 of the sliding plunger 33, which can only occur when the pawl engages one of the deep teeth 49 of the ratchet wheel. During the intermittent rotation of the ratchet wheel, therefore, its teeth serve as a counting mechanism by which a rotative movement of the shear blades, or a multiple thereof, is rendered operative in severing a piece of metal inserted between them. When each forward movement of the ratchet wheel is reversed by the spring actuated latch 53, the counting operation is discontinued and the ratchet wheel 43 swings forward actuated by the pawl 35 and backward actuated by the spring 56.

By the above described construction, I render the shear blades operative or inoperative at will by a variation between their axes. The time of variation between their axes, by which said blades are rendered operative, is determined relatively to a rotative movement of the blades, or a multiple thereof, by means of a counting mechanism, as above described. The counting mechanism itself is, however, capable of being rendered inoperative, thereby continuing the shear in a state of operativeness, or of inoperativeness, as desired. The complete control by the operator of the cutting mechanism is therefore accomplished, enabling the shear blades to cut at each revolution or not at all, or to cut at any desired multiple rotations, or to begin or end the cutting operations at any desired stage in the movement of the metal between the axes of the shear blades.

I claim,

1. In a metal cutting shear, comprising a pair of rotating shear blades, means for rotating said blades, means for feeding the metal to be severed to said blades at a predetermined speed, and means for varying the speed of said shear blades relatively to the speed of the metal feeding mechanism.

2. In a metal cutting shear, a pair of rotatable shafts having parallel axes, cutting blades carried by said shafts and arranged to coöperate in severing the metal placed between them, means for rotating said shafts, means for varying the speed of said shafts, a pair of feed rolls, and means for rotating said feed rolls.

3. In a metal cutting shear, comprising a pair of rotatable shafts, cutting blades carried by said shafts, a geared connection between said shafts, means for separating said shafts to allow the passage of metal to be severed between said cutting blades without disturbing said geared connection, the operation of said separating means being capable of regulation at will.

4. In a metal cutting shear, a pair of cutting blades, means for imparting a synchronous rotative movement to said cutting blades, automatic means operated by said rotating means for varying the distance between said blades at predetermined periods in said rotative movement, with said periods of variation determinable at will.

5. In a metal cutting shear, a pair of coacting cutting blades, means for imparting a synchronous rotative movement to said blades about parallel axes, means for normally holding said blades separated to render them inoperative without interrupting said rotative movement, and means operated by said rotative movement for bringing said blades into operative relation.

6. In a metal cutting shear, a pair of rotatable blades, means for rotating said blades, means for varying the speed of said blades, means for feeding the metal to be severed between said blades, and means for bringing said blades into coöperative relation with each other at will.

7. In a metal cutting shear, a rotatable shaft journaled in fixed bearings, a cutting blade carried by said shaft, a second rotatable shaft journaled in a movable bearing, a cutting blade carried by said second shaft coöperating with said first cutting blade, means for normally holding said movable bearing and the cutting blade carried thereby in inoperative position, and means for bringing said movable bearing and said cutting blade into operative position at will.

8. In a metal cutting shear, a pair of rotatable coacting blades, means for maintaining said blades in inoperative relation to each other, means for bringing said blades into operative relation to each other at will, and means for interrupting the operation of said blades at predetermined periods in the rotative movement of the blades.

9. In a metal cutting shear, a pair of rotatable coacting shear blades, means for continuously rotating said shear blades, and automatic means operated from said means of rotation for interrupting the cutting action of said blades at predetermined periods in the rotative movement of said blades.

10. In a metal cutting shear, a pair of rotatable coacting shear blades, a pair of feed rolls, means for rotating said shear blades, means for rotating said feed rolls, and means for varying the relative speed of said feed rolls and said shear blades.

11. In a metal cutting shear, a pair of rotatable coacting shear blades, means for continuously rotating said shear blades, automatic means for rendering said blades operative or inoperative at predetermined periods in the rotative movements of said blades, and means for determining said periods at will.

12. In a metal cutting shear, a pair of rotatable coacting shear blades, means for rendering said blades operative, or in operative, at predetermined rotative movements, means for determining said rotative movements, comprising a counting mechanism and means for rendering said counting mechanism inoperative.

13. In a metal cutting shear, a cutting mechanism, means for actuating said cutting mechanism, arranged to operate continuously, means for normally maintaining said cutting mechanism in an inoperative position, means for transferring said continuously operating cutting mechanism to an operative position as desired, and automatic means for controlling the action of said transferring means.

14. In a metal cutting shear, a cutting mechanism, means for actuating said cutting mechanism, arranged to operate continuously, means for removing a portion of said continuously operating cutting mechanism from its operative position, thereby checking the operation of said cutting mechanism, and automatic mechanism for controlling the action of said removing means.

15. In a metal cutting shear, a cutting mechanism, means for actuating said cutting mechanism, arranged to operate continuously, means for placing a portion of said continuously operating cutting mechanism in an inoperative position at predetermined intervals, and means for automatically determining said intervals.

16. In a metal cutting shear, a cutting mechanism, comprising a pair of rotatable shear blades, with one of said shear blades journaled in a movable yoke, means for moving said yoke to separate slightly the cutting edges of said shear blade, means for returning said yoke to bring said blades into operative position as desired, and automatic means for controlling said returning means.

17. In a metal cutting shear, a cutting mechanism, comprising a pair of rotating shear blades, with one of said blades journaled in a movable bearing, means for moving said movable bearing to render said blades inoperative, means for restoring said bearing to an operative position, and means for determining the action of the bearing moving mechanism at each operation of cutting.

18. In a metal cutting shear, a yoke pivotally supported in the framework of the machine, a cutting mechanism, comprising a pair of rotating shear blades, with one of said blades journaled in said pivoted yoke, means for raising said yoke to render said blades inoperative, means for depressing said yoke to bring said blades into operative relation, and means for determining the action of said yoke depressing mechanism at each operation of cutting.

19. In a metal cutting shear, a fixed rotating shear blade, a yoke pivotally supported at one end in the framework of the machine, a rotatable shear blade journaled in the free end of said yoke and arranged to coöperate with said fixed shear blade, an eccentric journaled in the free end of said yoke, a plate actuated by said eccentric, and a fixed abutment on the framework to receive the impact of said plate.

20. In a metal cutting shear, a fixed rotating shear blade, a pivoted yoke, a rotatable shear blade journaled in said yoke and arranged to coöperate with said fixed shear blade, an eccentric journaled in said yoke, a plate actuated by said eccentric, a fixed abutment to receive the impact of said plate, and means for moving said plate out of alinement with said abutment.

21. In a metal cutting shear, a fixed rotating shear blade, a yoke pivoted at one end, a rotatable shear blade journaled in the free end of said yoke and arranged to coöperate with said fixed shear blade, a spring applied to raise the free end of said yoke, and means for depressing the free end of said yoke.

22. In a metal cutting shear, a fixed rotating shear blade, a yoke pivoted at one end, a rotatable shear blade journaled in the free end of said yoke and arranged to coöperate with said fixed shear blade, a spring for holding the free end of said yoke in a normally raised position, means for depressing the free end of said yoke, and means for controlling said yoke depressing mechanism.

23. In a metal cutting shear, a fixed rotating shear blade, a pivoted yoke, a rotatable shear blade journaled in said yoke and arranged to coöperate with said fixed shear blade, yielding means for holding said yoke in a raised position, means for depressing said yoke, and means for controlling said yoke depressing means relatively to the rotative movement of said shear blade.

24. In a metal cutting shear, a pair of rotating shear blades, yielding means for holding one of said shear blades in a raised inoperative position, means for depressing said shear blade into an operative position, and means for controlling said depressing mechanism, comprising a pawl and ratchet and means for actuating said ratchet a single tooth in correspondence with the rotative movement of said shear blade.

25. In a metal cutting shear, a movable shear blade, means for actuating said shear blade, a controlling mechanism for moving said shear blade into operative position, a fixed shear blade arranged to coöperate with said movable shear blade when in said operative position and means for actuating said controlling mechanism synchronously with the shear blade actuating mechanism and for interrupting the action of said controlling mechanism at predetermined periods.

Dated this fifteenth day of July 1909.

VICTOR E. EDWARDS.

Witnesses:
PENELOPE COMBERBACH,
NELLIE WHALEN.